Dec. 23, 1930.  N. A. CHRISTENSEN  1,786,003
COMPRESSOR DRIVE
Filed March 15, 1929
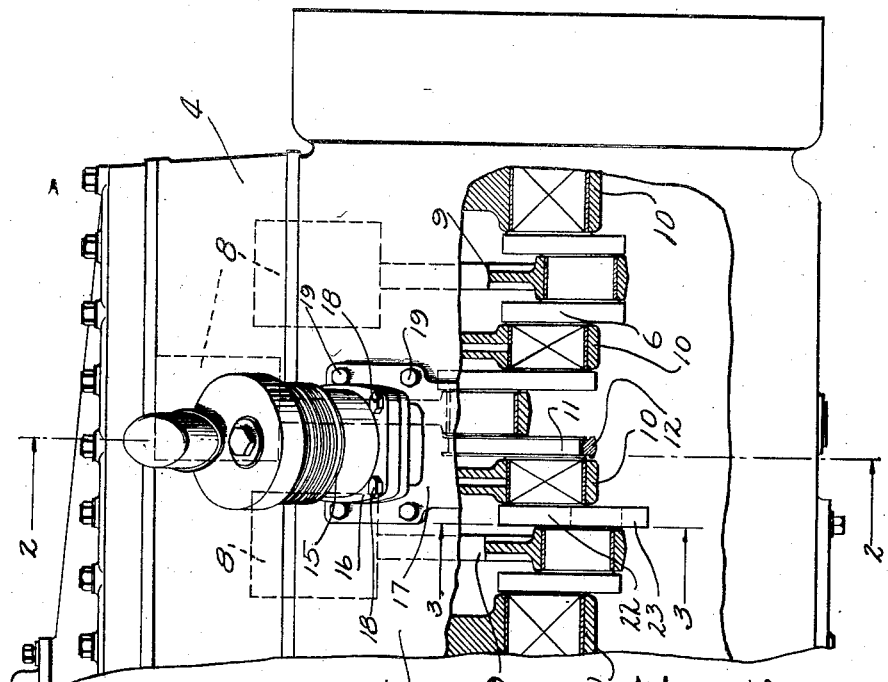
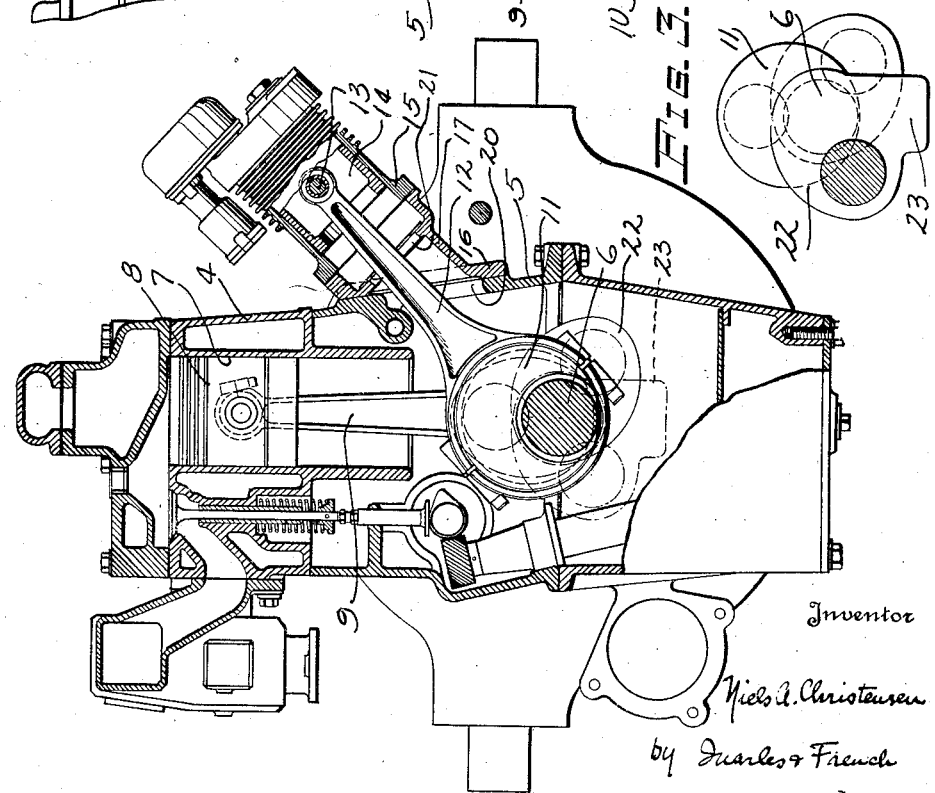
Inventor
Niels A. Christensen
by Duarles & French
Attorney Patented Dec. 23, 1930

1,786,003

UNITED STATES PATENT OFFICE

NIELS A. CHRISTENSEN, OF CLEVELAND, OHIO

COMPRESSOR DRIVE

Application filed March 15, 1929. Serial No. 347,221.

The invention relates to automotive compressors.

In several prior United Stated Letters Patents I have shown and described a compressor drive arrangement wherein the compressor is driven off the front end of the crank shaft and is associated with the front end plate. In certain designs of automotive equipment this type of drive cannot be readily incorporated and it is the object of this invention to provide a drive for the compressor that may be readily incorporated in automotive power plants of existing design without substantial changes in the motor. More particularly, according to the present invention the compressor is driven from the intermediate portion of the crank shaft of a multicylinder engine by forming the compressor drive member as a part of one of the crank checks of the crank shaft and mounting the compressor cylinder on the engine crankcase at an angle to the power cylinders.

The invention further consists in the several features hereinafter set forth and more particularly defined by claims at the conclusion hereof.

In the drawings Fig. 1 is a detail side elevation view of apparatus embodying the invention, parts being broken away and parts being shown in section;

Fig. 2 is a detail sectional view taken on the line 2—2 of Fig. 1;

Fig. 3 is a detail sectional view taken on the line 3—3 of Fig. 1.

Referring to the drawings the numeral 4 designates generally a multi-cylinder, internal combustion, automotive engine, 5 the crankcase, 6 the crank shaft, 7 one of the engine cylinders, 8 the pistons, 9 the connecting-rods operatively connecting said piston to said crank shaft and 10 the crank shaft bearings.

In accordance with the present invention one of the crank cheeks 11 is formed into a drive eccentric upon which the adjustable big end bearing of the connecting-rod 12 for the compressor is mounted, said rod being connected by the wristpin 13 to the compressor piston 14 working in a cylinder 15.

The cylinder 15 has a pad portion 16 removably secured to a specially formed crankcase cover plate 17 by bolts 18, said cover plate being removably secured by bolts 19 to the crankcase 4 of the motor over the opening 20. The compressor cylinder is mounted at an angle to the motor cylinders by the inclination of the top face of said cover plate and the rod 12 works through the opening 20 and through the opening 21 in said cover plate.

The compressor is equipped with the usual inlet and discharge valve and it will be observed that it is driven direct from the crank shaft by said eccentric in a simple and practical manner and this form of drive may be readily applied to existing engine equipment by the substitution of a new crank shaft embodying said eccentric and the substitution of the special mounting plate in place of the usual crankcase cover plate.

In order to balance the inertia effects of the eccentric and the other rotating parts, one of the adjacent crank cheeks 22 is provided with a special counterweighted portion 23, which is preferably provided on the crank throw on the opposite side of the bearing from that of the eccentric.

This application is to be considered a division of my application Serial No. 347,220, filed Mar. 15, 1929, as to any common claimable subject matter.

I desire it to be understood that this invention is not to be limited to any particular form or arrangement of parts except insofar as such limitations are specified in the claims.

What I claim as my invention is:

1. In an automotive engine, the combination with the engine frame, of a compressor cylinder mounted on said frame, a piston working in said cylinder, and means for driving said piston direct from the engine crank shaft comprising an eccentric formed on one of the crank cheeks of the crank of one of the power pistons.

2. In an automotive engine, the combination of a power crank shaft for the engine provided with an intermediate crank cheek having an eccentric formed thereon, a compressor cylinder mounted on the engine, a piston working in said cylinder, and means including a connecting-rod operatively connecting said piston with said eccentric.

3. In an automotive engine, the combination with the crankcase of said engine having a side opening, of a compressor mounting plate detachably secured over said side opening and having an angularly disposed base portion, a compressor cylinder mounted on said base portion, a piston working in said cylinder, a power crank shaft for the engine provided with a crank portion formed as an eccentric, and a connecting-rod operatively connected to said eccentric and said piston.

4. In an automotive engine, the combination with the engine frame, of a compressor cylinder mounted on said frame, a piston working in said cylinder, a power crank shaft for the engine provided with an intermediate crank cheek portion having an eccentric formed thereon, means including a connecting-rod operatively connecting said piston with said eccentric, said crank shaft having a bearing adjacent said eccentric, and a counterweight on another crank portion of said shaft on the opposite side of said bearing.

In testimony whereof, I affix my signature.

NIELS A. CHRISTENSEN.